United States Patent
Rosenberg et al.

(10) Patent No.: US 7,671,700 B1
(45) Date of Patent: Mar. 2, 2010

(54) HOLLOW WAVEGUIDE DIRECTIONAL COUPLER

(75) Inventors: Uwe Rosenberg, Backnang (DE); Konstantinos Beis, Backnang (DE)

(73) Assignee: Ericsson AB, Stockholm (SE)

(*) Notice: Subject to any disclaimer, the term of this patent is extended or adjusted under 35 U.S.C. 154(b) by 1450 days.

(21) Appl. No.: 10/502,079

(22) PCT Filed: Jan. 23, 2003

(86) PCT No.: PCT/IB03/00513

§ 371 (c)(1),
(2), (4) Date: Jan. 13, 2005

(87) PCT Pub. No.: WO03/063289

PCT Pub. Date: Jul. 31, 2003

(30) Foreign Application Priority Data

Jan. 23, 2002 (DE) .................. 102 02 664

(51) Int. Cl.
*H01P 5/18* (2006.01)
*H01P 5/02* (2006.01)
(52) U.S. Cl. .................. 333/113; 333/111
(58) Field of Classification Search .............. 333/109, 333/110, 111, 112, 113, 114, 115
See application file for complete search history.

(56) References Cited

U.S. PATENT DOCUMENTS

| 2,558,385 | A |   | 6/1951 | Purcell |
| 2,626,990 | A | * | 1/1953 | Pierce .................. 333/135 |
| 2,975,381 | A |   | 3/1961 | Reed |
| 3,044,026 | A | * | 7/1962 | Patterson .............. 333/113 |
| 4,567,401 | A | * | 1/1986 | Barnett et al. .......... 315/5 |
| 4,635,006 | A | * | 1/1987 | Praba .................. 333/111 |
| 4,679,011 | A | * | 7/1987 | Praba et al. ........... 333/111 |

FOREIGN PATENT DOCUMENTS

| GB | 628547    | 8/1949 |
| GB | 826810    | 1/1960 |
| JP | 04150401  | 5/1992 |
| JP | 2000022412 | 1/2000 |
| WO | WO 0235642 | 5/2002 |

\* cited by examiner

*Primary Examiner*—Dean O Takaoka
(74) *Attorney, Agent, or Firm*—Krischstein, et al.

(57) ABSTRACT

A hollow waveguide directional coupler comprises two hollow waveguide sections that are coupled to each other by a plurality of coupling openings formed in a wall extending between the hollow waveguide sections. Two adjacent coupling openings have a distance of $3\lambda_g/4$. from each other, $\lambda_g$ being the wavelength of the nominal center frequency of the operating frequency range of the directional coupler.

9 Claims, 2 Drawing Sheets

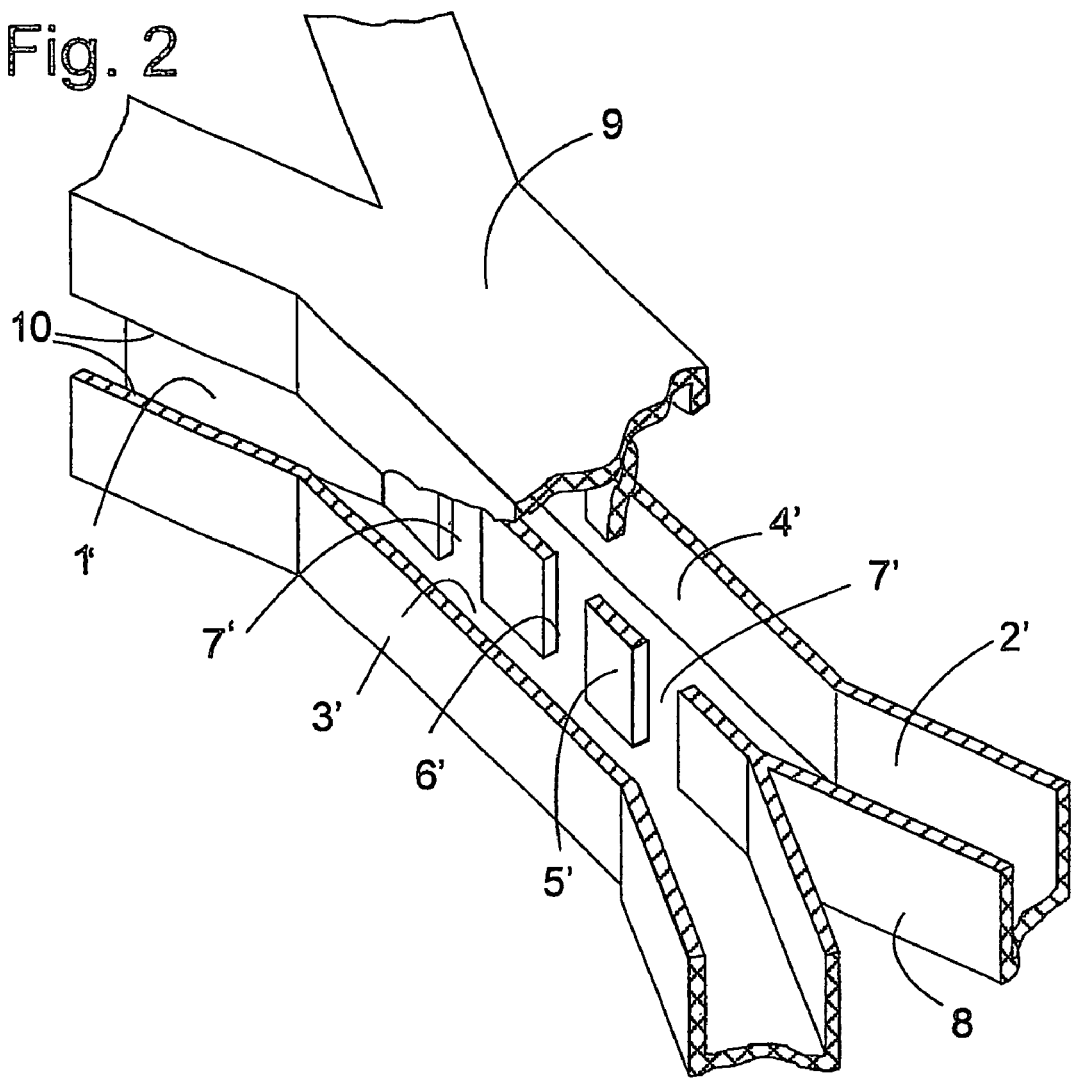

HOLLOW WAVEGUIDE DIRECTIONAL COUPLER

BACKGROUND OF THE INVENTION

The present invention relates to a hollow waveguide directional coupler having two hollow waveguide sections connected to each other by a plurality of coupling openings formed in a wall extending between the hollow waveguide sections.

Such directional couplers are generally known. Directional couplers of this type having two coupling openings are described e.g. in Meinke-Gundlach, Taschenbuch der Hochfrequenztechnik, 5. Auflage, Springer 1992, Chapter L7.4. Such directional couplers have good directivity for wavelengths $\lambda_g$ in a range of four times the distance between the coupling openings, where $\lambda_g$ is the wavelength of the nominal centre frequency of the operating frequency range of the directional coupler. The directivity is based on the fact that the fields coupled at the two openings from the transit hollow waveguide section to the driven hollow waveguide section propagate in both directions in the driven hollow waveguide, and that the fields that propagate in the same direction as in the transit waveguide interfere constructively, whereas, in the opposite direction, they have a phase difference of $\lambda/2$ and thus cancel each other.

Hollow waveguide directional couplers having a plurality of coupling openings are described e.g. in R. Levy "Analysis and Synthesis of Waveguide Multi-aperture Directional Couplers", IEEE Trans. on Microwave Theory and Tech., Vol. MTT-16, No. 12, December 1968 and in H. Schmiedel et al. "Field Theory Design of Rectangular Waveguide Multiple-Slot Narrow-Wall Couplers", IEEE Trans. on Microwave Theory and Tech., Vol. MTT-34, No. 7, July 1986.

The dimensions of these coupling openings and the wall sections between them are obviously proportional to the RF wavelengths with which they are to be used. Applications in the millimeter-wavelength range require dimensions of the coupling openings and the wall portions which are difficult to manufacture with conventional manufacturing techniques such as edging and machining. In particular when strong couplings are required, a high number of coupling openings is necessary, because the cross section area of a single coupling opening is limited by the requirement that a wall portion separating it from an adjacent coupling opening must be strong enough to withstand the loads to which it is exposed during manufacture.

It is readily apparent that the effort for manufacturing such a directional coupler increases with the number of coupling openings that must be manufactured. The effort for the manufacture of the directional coupler does not only increase linearly with the number of required coupling openings or, what is more or less equivalent, with the length of the coupling section, but exponentially. The reason for this is the non-vanishing probability that during manufacture a wall portion becomes damaged and the complete directional coupler is thus spoiled. The higher the number of existing wall portions, the less is the probability that all of them will survive the manufacture undamaged.

SUMMARY OF THE INVENTION

Accordingly, there is a need for a directional coupler, in particular for radio frequencies in the millimeter wavelength range, that can be manufactured with conventional methods and with a good yield.

The object is achieved by a hollow waveguide directional coupler having the features of claim 1.

By increasing the distance between adjacent coupling openings to an uneven multiple of $\lambda_g/4$ with respect to conventional directional couplers, the same phase relation between fields coupling from the transit waveguide section into the driven waveguide section and, thus, the same directivity is achieved as with a conventional $\lambda/4$-directional coupler. However, since the wall portions between two adjacent coupling openings can have a larger cross section area, they are more stable than conventional ones and less susceptible to damage.

In order to keep the length of the directional coupler low, the distance of the coupling openings is preferably chosen as $3\lambda_g/4$.

The wall in which the coupling openings are formed may be a broad or a narrow side-wall of the coupling rectangular hollow waveguide sections.

If the coupling is carried out by broad side-walls of the hollow waveguide sections, there is an advantage in that the complete directional coupler can be manufactured from two mirror-symmetric half-shells, each of which receives one half of the free cross section of the transit and driven hollow waveguide sections. The junctions at which the two half-shells meet correspond here to a node line of transversal currents induced in the walls of the hollow waveguide sections by a $TE_{10}$ wave, so that transition impedances between the two halves have no influence on the induced currents.

A coupling of the hollow waveguide portions by their narrow side-walls has the advantage that the channel that must be etched, machined or formed in any other appropriate manner has a depth which is rather small in relation to its width and can thus be formed in a rather short time. At the same time, the height of the wall sections between the two coupling openings is rather small, whereby their mechanical stability and manufacture yield is improved.

According to the invention, the dimension of the coupling openings in the longitudinal direction of the hollow waveguide sections may be made greater than in a conventional directional coupler, preferably it can be set to $\lambda/8$ and, preferably, to a value of $\lambda/4$ that cannot be realised with a conventional $\lambda/4$-directional coupler. The increase in size of the coupling openings allows the number of coupling openings required for a given coupling efficiency to be reduced, whereby, again, the cost of manufacture is decreased. Since a strong coupling is easily achieved, the thickness of the wall between the coupling hollow waveguide portions may be chosen greater than in conventional directional couplers, whereby, again, the manufacturing process is simplified.

In order to achieve as high a bandwidth of coupling as possible, the coupling openings should have a length which decreases from the centre to the ends of the directional coupler.

BRIEF DESCRIPTION OF THE DRAWINGS

Further features and advantages of the invention will become apparent from the subsequent description of embodiments with reference to the appended figures in which FIG. 2 is an exploded cross sectional view of the two half-shells of a directional coupler according to a second embodiment of the invention, wherein the coupling openings are formed in a broad side-wall of the hollow waveguide sections.

DETAILED DESCRIPTION OF THE PREFERRED EMBODIMENTS

Figure 1:
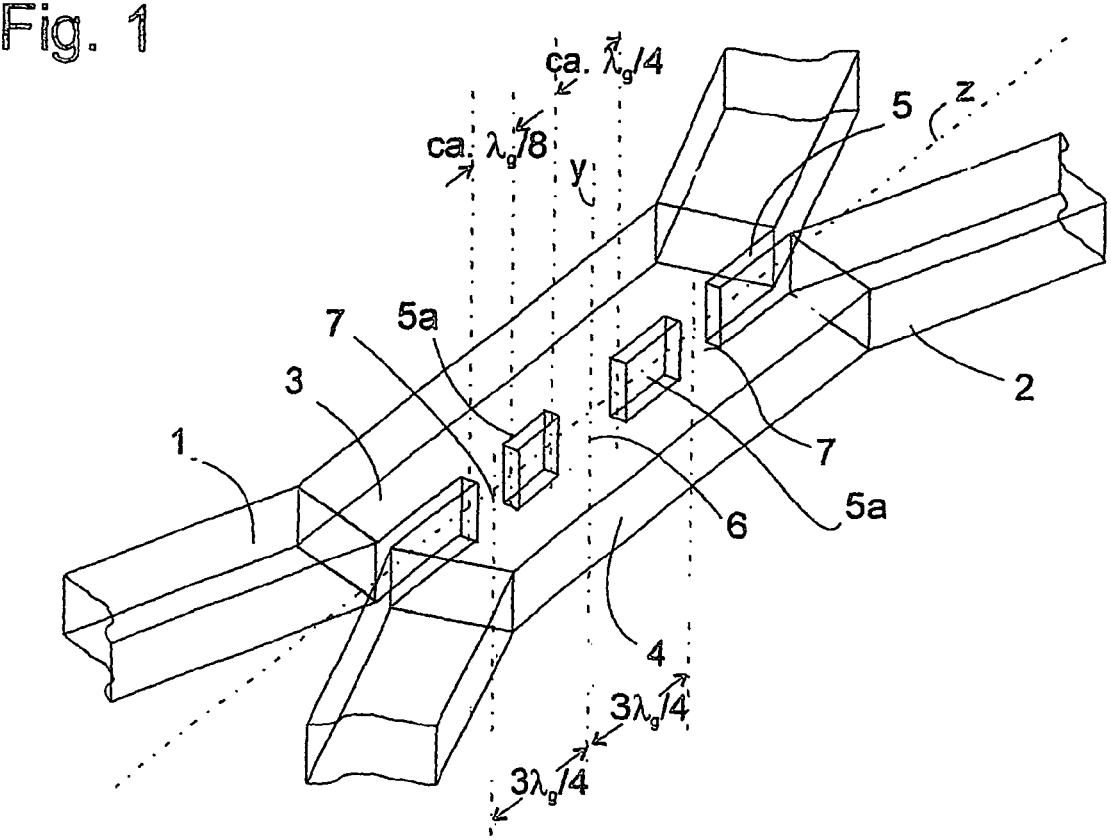
FIG. 1 is a schematic representation of a directional coupler according to a first embodiment of the invention, in which the coupling openings are formed at a narrow side of two coupling hollow waveguide sections.

FIG. 1 shows a perspective view of two rectangular hollow waveguides, here referred to as transit waveguide 1 and driven waveguide 2. There is no physical difference between the two hollow waveguides implied by the different terminology, one is the exact specular image of the other with respect to a plane extending between the two and defined by dash-dot lines y, z.

Between two parallel sections 3, 4 of the two waveguides 1, 2, there extends a wall 5 which forms a narrow side-wall of the two sections 3, 4. In the example shown, the wall 5 is interrupted at three places by coupling openings 6, 7. The centres of two adjacent coupling openings 6, 7 have a distance of 3 $\lambda_g/4$ from each other. The width of the central coupling opening 6 is approximately $\lambda_g/4$, that of the two peripheral coupling openings 7 is $\lambda_g/8$. This implies a width of the wall portions 5a of wall 5 delimited by the coupling openings 6, 7 of $9/16\lambda_g$.

The width of the opening 6, 7 may be greater than $\lambda_g/4$.

FIG. 2 shows an exploded view of a directional coupler according to a second embodiment, in which the wall 5' with coupling openings 6' formed in it is a broad side-wall of the two coupling hollow waveguide sections 3', 4'. The distance of the coupling openings 6', 7' in the wall 5' from each other and the width in propagation direction of the same is described with respect to FIG. 1. The walls of the directional coupler are formed by two identical metallic or superficially metallized half-shells 8, 9, from which the upper one 9 is shown with one half of it cut away so as to show the interior of the lower half-shell 8.

In the assembled directional coupler, the two half-shells 8, 9 touch each other at shaded edges 10. If the cross sections of the waveguides 1, 2 are dimensioned such that at the wavelength $\lambda_g$ only the $TE_{10}$ wave can propagate, there is no current flowing perpendicular to the edges 10, so that the quality of the galvanic coupling between the two half-shells 8, 9 is without relevance for the damping of the directional coupler.

The invention claimed is:

1. A directional coupler, comprising: two hollow waveguide sections connected to each other by a plurality of coupling openings formed in a wall extending between the hollow waveguide sections, two adjacent coupling openings of said plurality having a distance of $(2n+1)\lambda_g/4$ from each other, wherein $\lambda_g$ is a wavelength of a nominal center frequency of an operating frequency range of the directional coupler, wherein n is an integer, and wherein the two adjacent coupling openings are separated from each other by a wall portion having a length of more than $\lambda_g/4$.

2. The directional coupler according to claim 1, in that n equals 1.

3. The directional coupler according to claim 1, in that the hollow waveguide sections have rectangular cross-sections, and in that the wall forms a narrow side-wall of the hollow waveguide sections.

4. The directional coupler according to claim 1, in that the hollow waveguide sections have rectangular cross-sections, and in that the wall forms a broad side-wall of the hollow waveguide sections.

5. The directional coupler according to claim 1, in that at least one of the coupling openings has a dimension in a longitudinal direction of the hollow waveguide sections of $\lambda_g/8$.

6. The directional coupler according to claim 5, wherein the dimension is on the order of $\lambda_g/4$.

7. The directional coupler according to claim 1, in that each coupling opening has a dimension in a longitudinal direction of the hollow waveguide sections of at least $\lambda_g/8$.

8. The directional coupler according to claim 1, in that each coupling opening has a length that decreases from a center towards an end of the directional coupler.

9. The directional coupler according to claim 1, wherein the length is on the older of $\lambda_g/2$.

* * * * *